(12) United States Patent
Zheng et al.

(10) Patent No.: US 12,385,533 B2
(45) Date of Patent: Aug. 12, 2025

(54) BRAKE DUST FILTERING APPARATUS AND VEHICLE

(71) Applicant: Wuhan Lotus Cars Co., Ltd., Wuhan (CN)

(72) Inventors: Bowen Zheng, Hangzhou (CN); Xiaoqian Zhang, Hangzhou (CN)

(73) Assignee: Wuhan Lotus Cars Co., Ltd., Wuhan (CN)

( * ) Notice: Subject to any disclaimer, the term of this patent is extended or adjusted under 35 U.S.C. 154(b) by 349 days.

(21) Appl. No.: 18/029,669

(22) PCT Filed: Nov. 23, 2020

(86) PCT No.: PCT/CN2020/130831
§ 371 (c)(1),
(2) Date: Mar. 31, 2023

(87) PCT Pub. No.: WO2022/104778
PCT Pub. Date: May 27, 2022

(65) Prior Publication Data
US 2023/0407928 A1 Dec. 21, 2023

(51) Int. Cl.
*F16D 65/00* (2006.01)
(52) U.S. Cl.
CPC .................. *F16D 65/0031* (2013.01)
(58) Field of Classification Search
CPC .................................. F16D 65/0031
See application file for complete search history.

(56) References Cited

U.S. PATENT DOCUMENTS

| 10,072,716 | B2 | | 9/2018 | Metayer |
| 11,248,669 | B2 | * | 2/2022 | Bock ....................... F16D 65/02 |
| 11,493,101 | B2 | * | 11/2022 | Kuemmerling ..... F16D 65/0031 |
| 11,773,929 | B2 | * | 10/2023 | Kuemmerling ..... F16D 65/0031 |
| | | | | 188/73.31 |

(Continued)

FOREIGN PATENT DOCUMENTS

| CN | 106051917 A | 10/2016 |
| CN | 109974099 A | 7/2019 |

(Continued)

OTHER PUBLICATIONS

International Search Report of PCT Patent Application No. PCT/CN2020/130831 issued on Aug. 19, 2021.

(Continued)

*Primary Examiner* — Thomas W Irvin
(74) *Attorney, Agent, or Firm* — Andrew C. Cheng

(57) ABSTRACT

A brake dust filtering apparatus (100), comprising: a base (10) which is provided with multiple first through holes (101); a scribing sheet (20) which is provided with multiple second through holes (201) and can be slidably connected to the base (10); a filter screen (30) which is disposed on the side of the base (10) close to a brake caliper (200) and covers the first through holes (101); and a drive member (40) which is used for driving the scribing sheet (20) to slide with respect to the base (10), so as to form an off state in which each of the first through holes (101) and each of the second through holes (201) are staggered and an on state that the multiple first through holes (101) at least partially overlap the multiple second through holes (201). Further disclosed is a vehicle.

16 Claims, 5 Drawing Sheets

(56) References Cited

U.S. PATENT DOCUMENTS

| | | | |
|---|---|---|---|
| 11,859,680 B2* | 1/2024 | Bock | F16D 65/0081 |
| 12,287,017 B2* | 4/2025 | Hwang | C04B 35/111 |
| 2018/0031059 A1* | 2/2018 | Gelb | F16D 65/0031 |
| 2020/0278002 A1* | 9/2020 | Bock | B01D 46/106 |
| 2021/0140498 A1* | 5/2021 | Kuemmerling | F21V 15/01 |
| 2022/0205499 A1* | 6/2022 | Hwang | C04B 35/62245 |
| 2024/0229875 A1* | 7/2024 | Hur | F16D 65/0031 |
| 2024/0328470 A1* | 10/2024 | Woerz | F16D 65/0031 |
| 2025/0075755 A1* | 3/2025 | Giannini | B60T 17/221 |

FOREIGN PATENT DOCUMENTS

| | | |
|---|---|---|
| CN | 209371487 U | 9/2019 |
| CN | 111051725 A | 4/2020 |
| CN | 111271394 A | 6/2020 |
| CN | 111842393 A | 10/2020 |
| CN | 111845686 A | 10/2020 |
| DE | 202008009717 U1 | 12/2009 |
| DE | 102012022886 A1 | 10/2013 |
| DE | 102017008421 A1 | 3/2019 |
| KR | 101703098 B1 | 2/2017 |
| WO | 2011034431 A1 | 3/2011 |
| WO | 2020088900 A1 | 5/2020 |

OTHER PUBLICATIONS

The extended European search report of EP patent application No. 20962069.9 issued on Jul. 17, 2024.
The first Office Action of CN patent application No. 202080105664.8 issued on Jun. 29, 2024.
The search report of CN patent application No. 202080105664.8 issued on Jun. 29, 2024.

\* cited by examiner

BRAKE DUST FILTERING APPARATUS AND VEHICLE

CROSS REFERENCE TO RELATED APPLICATIONS

The present disclosure is a 35 U.S.C. § 371 National Phase conversion of International (PCT) Patent Application No. PCT/CN2020/130831, filed on Nov. 23, 2020. The entire contents of the above-identified applications are incorporated herein by reference. The PCT International Patent Application was filed and published in Chinese.

TECHNICAL FIELD

The present invention relates to the technical field of vehicles, and in particular, to a brake dust filtering apparatus and a vehicle.

BACKGROUND

With more and more rapid development of economy of our country, holdings of cars appears a tendence of increasing year by year. However, with the increase of the number of cars, environmental problems brought by cars are also increasingly serious. How to make vehicles be more environmentally friendly, and how to reduce dust emissions of vehicles so as to enhance market competitiveness are also topics studied competitively by major engine manufacturers.

A brake system of a car generates friction by a pressure between a metal brake plate and a friction piece composed of composite friction material. In the friction pair formed by the brake plate and the friction piece, in order to ensure that the vehicle can obtain a stable friction torque under various working conditions, slight wear of the brake plate and the friction material may be caused during braking, so it is inevitable to produce wear particles of different sizes, namely brake dust, during the wear process. Brake dust will attach to the vehicle's body and rims and affects the appearance of the vehicle. At the same time, the brake dust will also be discharged into the atmosphere with an air flow generated when the vehicle drives and pollute the environment. How to reduce or eliminate the pollution of brake dust to the environment is a major pain point in the research of automobile enterprises at present.

Brake dust of passenger cars mainly consists of the following two types. The first is low-temperature mechanical friction dust, which is mainly produced by mechanical shedding of both sides caused by mutually shearing of rough surfaces of a friction piece and of a brake plate at the micro level. This type of dust has particle size of mostly above 10 μm, is mainly attached to surfaces of rims or deposited on the ground, and will not generate a great impact on the environment and human health. The second is high-temperature chemical agglutination dust, which is mainly micro-particles produced by gas generated by decomposition of chemical substances in friction materials at high temperature and then cooled and condensed. This type of dust has a particle size of mostly below 10 μm, if it is discharged into the atmosphere, it will be suspended in the air for a long time and cause environmental pollution. At the same time, it is also prone to be inhaled by human bodies and cause disease.

In the prior art, dust around a brake caliper is absorbed by a filter box or a filter screen. Since they are in a normally open state, dust at edges of wheels and brake dust are absorbed by the filter box or the filter screen without difference, which seriously affects service life of the filter screen.

SUMMARY OF THE DISCLOSURE

In view of the above problems, the present invention is proposed to provide a brake dust filtering device and a vehicle that can overcome the above problems or at least partially solve the above problems.

One purpose of a first aspect of the present invention is to provide a brake dust filtering apparatus with a high filtering efficiency.

Another purpose of the present invention is to simplify structures and decrease occupied space.

A further purpose of the present invention is to improve service life of a filter screen.

A purpose of a second aspect of the present invention is to provide a vehicle including the above brake dust filter apparatus, thereby improving an efficiency of filtering brake dust.

In particular, according to one aspect of embodiments of the present invention, a brake dust filtering apparatus is provided. The brake dust filtering apparatus is mounted at a brake caliper of a vehicle or a part around the brake caliper, and comprises: a base which is provided with multiple first through holes; a scribing sheet which is provided with multiple second through holes and forms slidable connection with the base; a filter screen which is disposed on a side of the base close to the brake caliper and covers the first through holes; and a drive member which is configured for driving the scribing sheet to slide with respect to the base, so as to form an off-state in which each of the first through holes and each of the second through holes are staggered and an on-state in which the multiple first through holes at least partially overlap with the multiple second through holes.

Optionally, the drive member is a thermosensitive spring of which two ends are respectively connected to the base and the scribing sheet; the thermosensitive spring is configured to keep the scribing sheet and the base in the off-state in a normal temperature state, and generate deformation when the temperature exceeds a preset value to drive the scribing sheet to slide relative to the base to form the on-state.

Optionally, the thermosensitive spring includes a first mounting portion, a connecting portion, and a second mounting portion which are connected sequentially; the first mounting portion and the second mounting portion are respectively connected with the base and the scribing sheet.

Optionally, one end of the base is provided with a first longitudinal aperture and a stepped boss, the boss matches with the first mounting portion and is configured to limit the first mounting portion; the scribing sheet is provided with a first column part corresponding to the first longitudinal aperture and protruding towards the base, the first column part passes through the first longitudinal aperture and matches with the second mounting portion to limit the second mounting portion.

Optionally, a first fastening member is further included; the first fastening member is configured to match with the first column part to limit the second mounting portion.

Optionally, the first column part is cylindrical and is provided with screw thread on a surface thereof; the first fastening member is a nut.

Optionally, another end of the base is provided with a second longitudinal aperture; the scribing sheet is provided with a second column part corresponding to the second longitudinal aperture and protruding towards the base, the second column part is slidably sleeved in the second longitudinal aperture.

Optionally, the scribing sheet is located at a side of the base away from the brake caliper.

Optionally, the filter screen is fixed at the base in a preset manner, and the preset manner includes one or more of clamping connection, bolt connection, and lock pin connection.

Optionally, the filter screen is rectangular, three side surfaces of the filter screen are respectively provided with protruding clamp strips, and the other side surface is a plane; the base is provided with a groove configured to clamp the clamp strips and an abutting protrusion configured to abut against the plane.

Optionally, the base, the scribing sheet, and the filter screen are all of an arc shape matching with the brake caliper.

Optionally, two ends of the base are provided with mounting structures configured to receive second fastening members and thereby fix the brake dust filtering apparatus at the brake caliper or a part around the brake caliper.

Optionally, the drive member includes: an electronically controlled steering gear connected with the scribing sheet and configured to drive the scribing sheet to slide relative to the base based on a brake state of the vehicle.

Optionally, a brake controller is further included, it is connected with the electronically controlled steering gear and configured to receive a brake pedal signal of the vehicle to identify the brake state of the vehicle and send the brake state of the vehicle to the electronically controlled steering gear.

In particular, according to another aspect of embodiments of the present invention, a vehicle is provided. The vehicle includes a steering knuckle, a hub bearing, a matched brake caliper, and a ventilated brake plate; wherein the vehicle further includes a brake dust filtering apparatus according to any one of the above embodiments.

In the brake dust filtering apparatus of the present invention, the drive member can control the brake dust filtering apparatus to be in either the on-state or the off-state, and thus control whether dust, in particular dust generated during braking passes through the brake dust filtering apparatus. For example, when braking starts or the temperature reaches a certain value, the brake dust filtering apparatus is turned on, such that entering dust is filtered through the filter screen; the filter screen adsorbs particles contained in an air flow to provide a function of purifying the air flow. This solution realizes flexible and controllable opportunities of collecting and filtering dust in a vehicle, and is conducive to improve an efficiency of filtering dust.

Furthermore, the present invention provides a solution of using the thermosensitive spring as the drive member, this manner adopts pure mechanical structures to automatically identify the environmental temperature and thereby control the brake dust filter apparatus to turn on and off, is simple in structure and low in cost, and does not consume energy source additionally.

Furthermore, since the two types of friction dust are differentiated, elimination structures are specifically designed aiming at chemical agglutination dust with large detriment, an adsorption efficiency is high.

Furthermore, this solution only conducts an air flow to absorb dust under a high-temperature braking working condition, avoids inhaling impurities in the air under non-braking working conditions or a low-temperature braking working condition, and improves the service life of the filter screen.

Furthermore, the filter screen of the present invention is clamped to the base. This connection manner is convenient for replacing the filter screen, and can perform cleaning or replacement during normal maintenance of the vehicle. Therefore, the filter screen can be maintained and replaced in time to ensure the best dust adsorption effect.

Furthermore, the base, the scribing sheet, and the filter screen are all of an arc shape matching with the brake caliper. In this way, a filtering area is larger and can be matched with an existing brake caliper, with small space occupation, adjustable center of gravity, and low integration cost. The base, the scribing sheet, and the filter screen are all sheet-shaped pieces, so their masses are also relatively light.

The above description is only an overview of the technical solution of the present invention. In order to understand technical means of the present invention more clearly, so that it can be implemented according to the content of the specification, and in order to make the above and other purposes, features and advantages of the present invention be more obvious and understandable, specific implementations of the present invention are listed below.

According to the following detailed description of the specific embodiments of the present invention in combination with the attached drawings, those skilled in the art will be more aware of the above and other purposes, advantages and features of the present invention.

BRIEF DESCRIPTION OF THE DRAWINGS

Some specific embodiments of the present invention will be described in detail in an illustrative rather than restrictive manner with reference to the accompanying drawings later. The same reference marks in the drawings indicate the same or similar components or parts. Those skilled in the art should understand that these drawings are not necessarily drawn to scale. In the attached drawings.

DETAILED DESCRIPTION

Figure 1:
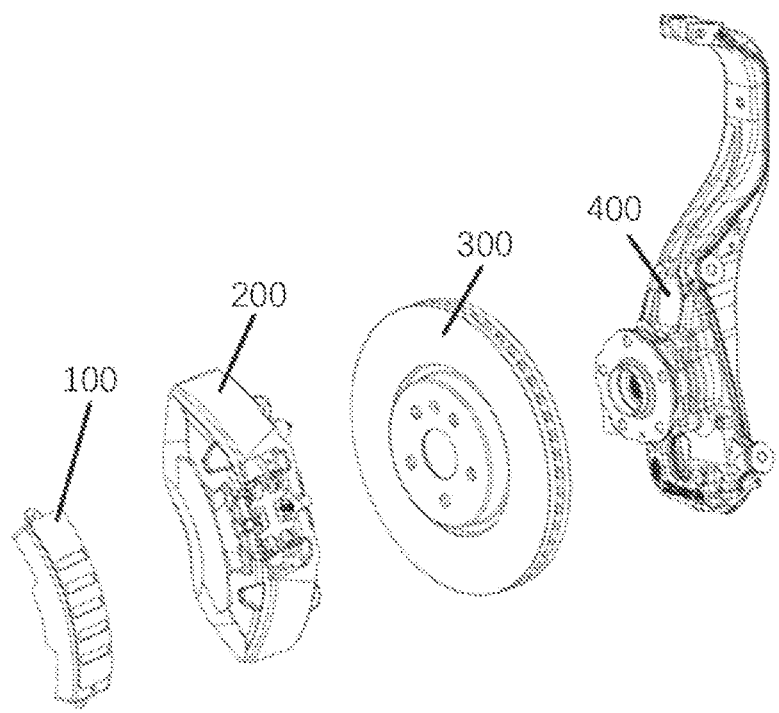
FIG. 1 is a disassembled schematic view of a brake dust filtering apparatus and its related elements according to an embodiment of the present invention.

Exemplary embodiments of the present disclosure will be described in more detail below with reference to the accompanying drawings. Although exemplary embodiments of the present disclosure are shown in the drawings, it should be understood that the present disclosure can be implemented in various forms and should not be limited by the embodiments described herein. On the contrary, these embodiments are provided in order that the disclosure can be understood more thoroughly and the scope of the disclosure can be convey to those skilled in the art completely.

FIG. 1 is a disassembled schematic view of a brake dust filtering apparatus 100 and its related elements according to an embodiment of the present invention. As shown in FIG. 1, the brake dust filtering apparatus 100 of the present invention is used in a vehicle including a matched brake caliper 200 and a ventilated brake plate 300, the brake caliper 200 is in a rigid connection with a steering knuckle and a hub bearing 400 of the vehicle, and the ventilated brake plate 300 can rotate around a central axis of the steering knuckle and the hub bearing 400. The steering knuckle and the hub bearing 400 are well-known structures, can be made of cast iron or cast aluminum, and provide functions of supporting and assembling other components. The brake caliper 200, the ventilated brake plate 300, and the steering knuckle and the hub bearing 400 are all mature products in the prior art, and their structures will not be detailed here.

Figure 2:
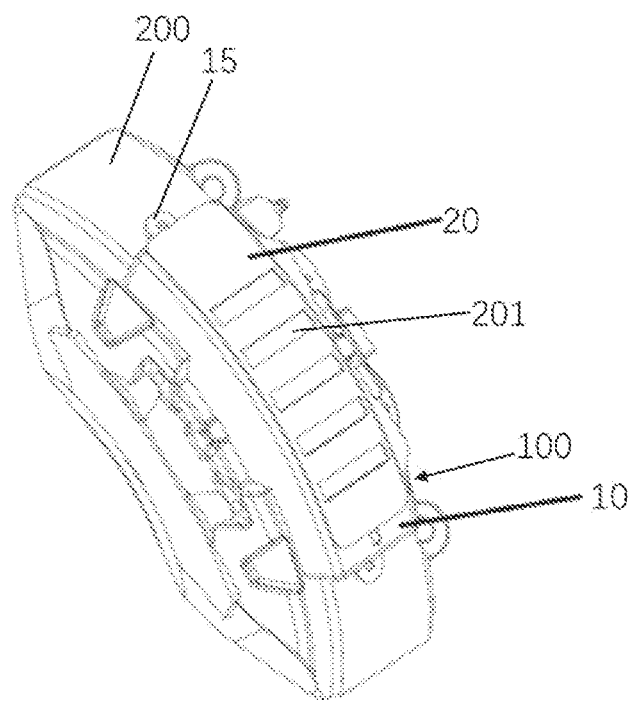
FIG. 2 is an assembled schematic view of a brake dust filtering apparatus in an off-state and a brake caliper according to an embodiment of the present invention.
Figure 3:
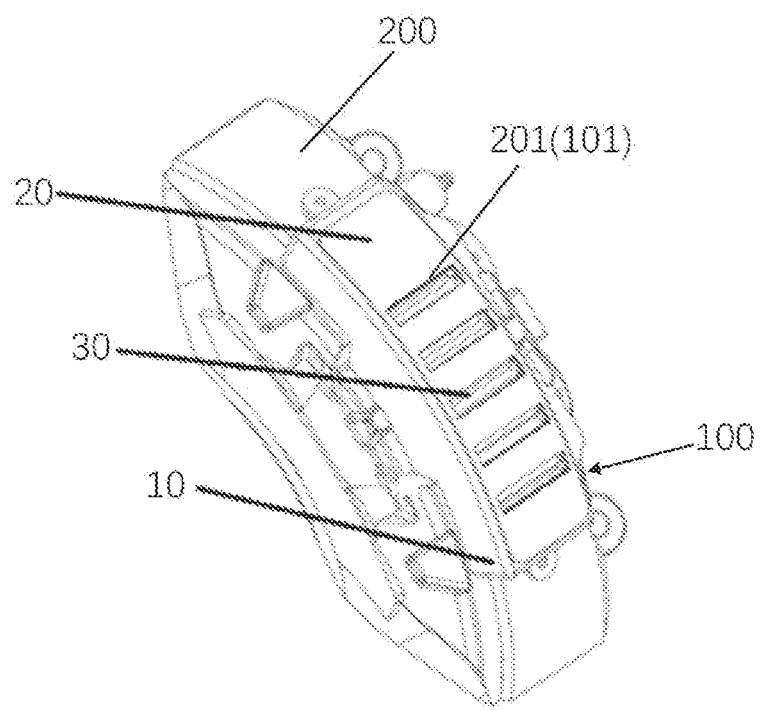
FIG. 3 is an assembled schematic view of a brake dust filtering apparatus in an on-state and a brake caliper according to an embodiment of the present invention.

FIG. 2 is an assembled schematic view of the brake dust filtering apparatus 100 in an off-state and the brake caliper 200 according to an embodiment of the present invention. FIG. 3 is an assembled schematic view of the brake dust filtering apparatus 100 in an on-state and the brake caliper 200 according to an embodiment of the present invention. As shown in FIG. 2, and FIG. 3 can also be referred to, in one embodiment, the brake dust filtering apparatus 100 of the present invention is mounted at the at the brake caliper 200 or a part around the brake caliper 200, for example, mounted on a side, the front, the rear, or other parts of the brake caliper 200, or at a steering knuckle, a fender, or other parts around brake caliper 200 in fixing manners of bolts, pins, etc. The brake dust filtering apparatus 100 includes a base 10, a scribing sheet 20, a filter screen 30, and a drive member 40. The base 10 is provided with multiple first through holes 101. The scribing sheet 20 is provided with multiple second through holes 102 and forms slidable connection with the base 10. The filter screen 30 is disposed on a side of the base 10 close to the brake caliper 200 and covers the first through holes 101. The drive member 40 is configured for driving the scribing sheet 20 to slide with respect to the base 10, so as to form an off-state in which each of the first through holes 101 and each of the second through holes 201 are staggered (see FIG. 2) and an on-state in which the multiple first through holes 101 at least partially overlap with the multiple second through holes 201 (see FIG. 3).

The brake dust filtering apparatus 100 of this embodiment, by controlling states of the drive member 40, can drive relative movement between the scribing sheet 20 and the base 10. Here, it is possible that the base 10 is fixed to the vehicle and the drive member 40 drives the scribing sheet 20 to slide relative to the base 10, and it is also possible that the scribing sheet 20 is fixed to the vehicle and the drive member 40 drives the base 10 to slide relative to the scribing sheet 20.

When the vehicle is running normally, wheels rotate, and the ventilated brake plate 300 in the rigid connection of the wheels rotates synchronously. Since the ventilated brake plate 300 is provided therein with ventilation ribs, during rotation, the ventilation ribs drive internal air to flow outward along a radius direction of the ventilated brake plate 300 under centrifugal action, and then dust is blown to flow to the brake dust filtering apparatus 100. The drive member 40 of this embodiment can control the brake dust filtering apparatus 100 to be in either the on-state or the off-state, and thus control whether dust, in particular dust generated during braking passes through the brake dust filtering apparatus 100. For example, when braking starts or the temperature reaches a certain value, the brake dust filtering apparatus 100 is turned on, such that entering dust is filtered through the filter screen 30; the filter screen 30 adsorbs particles contained in an air flow to provide a function of purifying the air flow. This solution realizes flexible and controllable opportunities of collecting and filtering dust in the vehicle, and is conducive to improve an efficiency of filtering dust.

Figure 4:
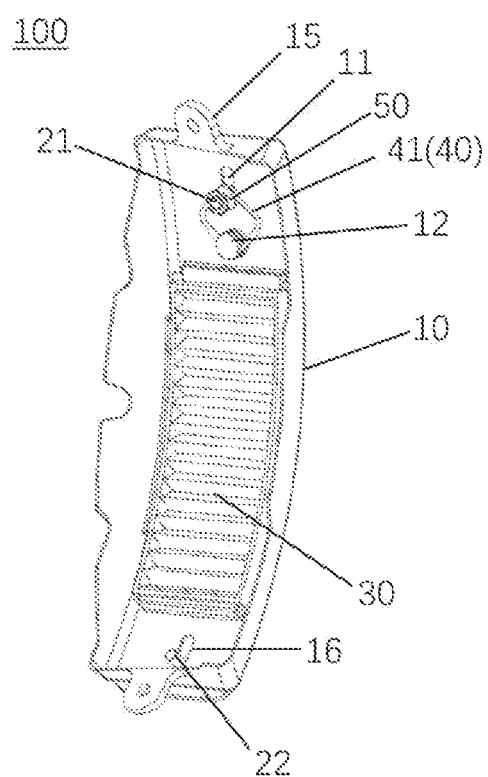
FIG. 4 is a structural schematic view of a back side of a brake dust filtering apparatus in an on-state according to an embodiment of the present invention.
Figure 5:
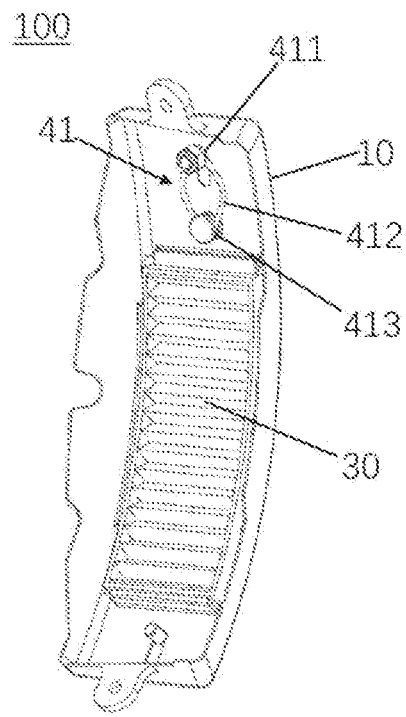
FIG. 5 is a structural schematic view of a back side of a brake dust filtering apparatus in an off-state according to an embodiment of the present invention.

FIG. 4 is a structural schematic view of a back side of the brake dust filtering apparatus 100 in the on-state according to an embodiment of the present invention. FIG. 5 is a structural schematic view of the back side of the brake dust filtering apparatus 100 in the off-state according to an embodiment of the present invention. As shown in FIG. 4, and FIG. 5 can also be referred to, in one embodiment, the drive member 40 is a thermosensitive spring 41 of which two ends are respectively connected to the base 10 and the scribing sheet 20; the thermosensitive spring 41 is configured to keep the scribing sheet 20 and the base 10 in the off-state in a normal temperature state, and generate deformation when the temperature exceeds a preset value to drive the scribing sheet 20 to slide relative to the base 10 to form the on-state.

In this embodiment, the thermosensitive spring 41 is set as the driving member 40. Because the thermosensitive spring 41 can deform to different degrees according to the temperature, and because the two ends of the thermosensitive spring 41 are connected with the base 10 and the scribing sheet 20, it is possible to control relative sliding of the base 10 and the scribing sheet 20 by sensing the temperature using the thermosensitive spring 41, and thereby control the brake dust filtering apparatus 100 to be turned on and off. The vehicle will generate heat and the above high-temperature chemical agglutination dust when braking, therefore, by reasonably setting the thermal spring 41, it is possible to realize that sufficient deformation occurs when the temperature reaches to generate high-temperature chemical agglutination dust, the brake dust filtering apparatus 100 is controlled to be turned on, and then filter is performed. When the vehicle is released from braking, the temperature of the ventilated brake plate 300 decreases, the temperature of the air flow decreases, and the brake dust filtering apparatus 100 changes from the on-state to the off-state. This manner of automatically recognizing the ambient temperature using pure mechanical structure to control the brake dust filtering apparatus 100 to be turned on and off is simple in structure, low in cost, and does not consume energy source additionally.

In this embodiment, the two types of friction dust are differentiated, elimination structures are specifically designed aiming at chemical agglutination dust with large detriment, an adsorption efficiency is high.

Furthermore, this solution only conducts an air flow to absorb dust under a high-temperature braking working condition, avoids inhaling impurities in the air under non-braking working conditions or a low-temperature braking working condition, and improves the service life of the filter screen 30.

As shown in FIG. 4, in a specific embodiment, the thermosensitive spring 41 is of an approximately elliptical shape and includes a first mounting portion 411, a connecting portion 412, and a second mounting portion 413 which are connected sequentially; the first mounting portion 411 and the second mounting portion 413 are respectively connected with the base 10 and the scribing sheet 20.

Figure 6:
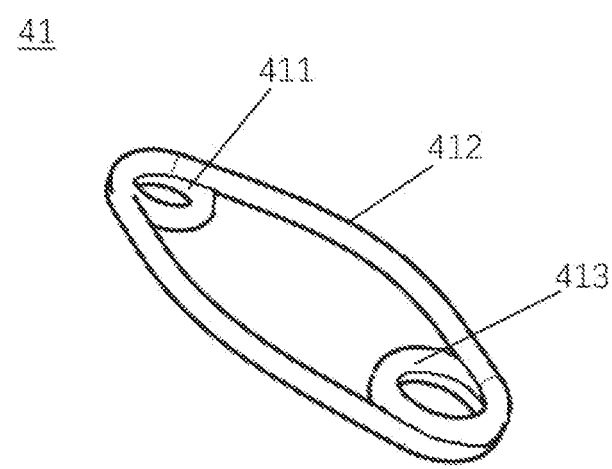
FIG. 6 is a structural schematic view of a thermosensitive spring of a brake dust filtering apparatus according to an embodiment of the present invention.

FIG. 6 is a structural schematic view of a thermosensitive spring of a brake dust filtering apparatus according to an embodiment of the present invention. As shown in FIG. 6, optionally, both the first mounting portion 411 and the second mounting portion 413 are circle holes formed by spirally winding thermosensitive wires. As shown in FIG. 5, at a normal temperature, a distance between the first mounting portion 411 and the second mounting portion 413 is relatively far. As shown in FIG. 4, at a high temperature, the connecting portion 412 expands to both sides and causes the first mounting portion 411 and the second mounting portion 413 to be close to each other, thereby driving the scribing sheet 20 and the base 10 to slide relative to each other.

Of course, in other embodiments that are not shown, the thermosensitive spring 41 can also be of other shapes, such as circle, spiral, L-shaped, etc.

Figure 7:
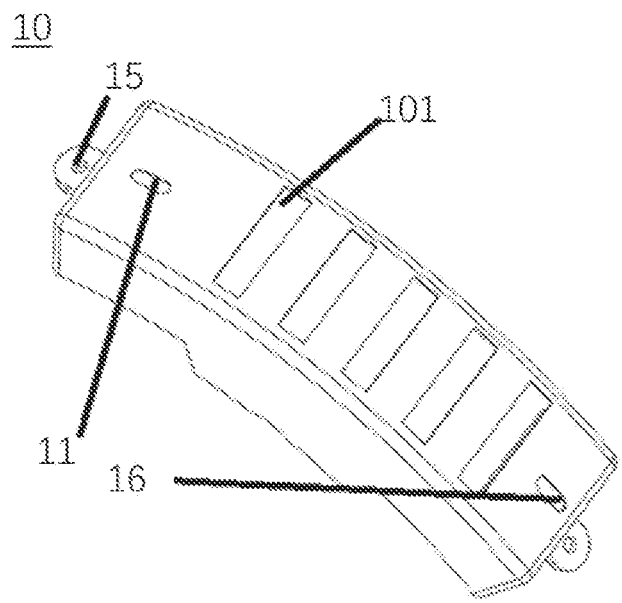
FIG. 7 is a structural schematic view of a front side of a base of a brake dust filtering apparatus according to an embodiment of the present invention.
Figure 8:
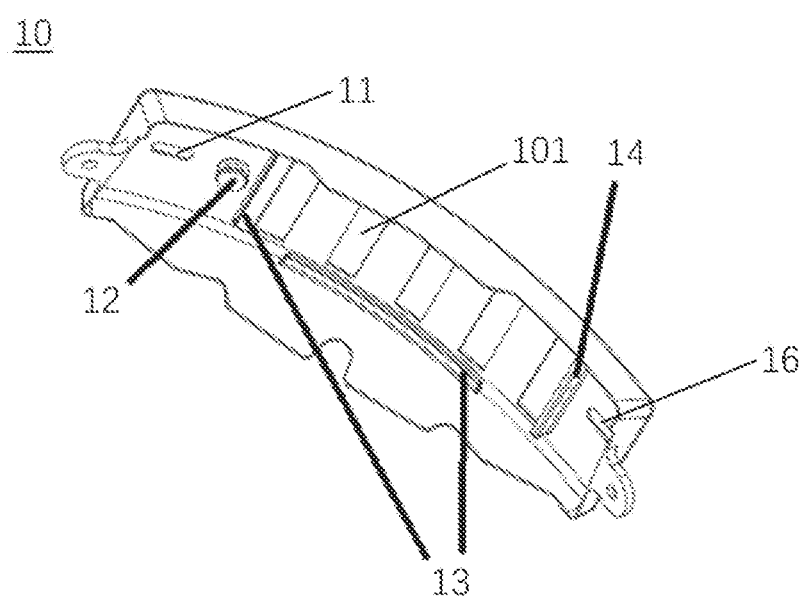
FIG. 8 is a structural schematic view of a back side of a base of a brake dust filtering apparatus according to an embodiment of the present invention.
Figure 9:
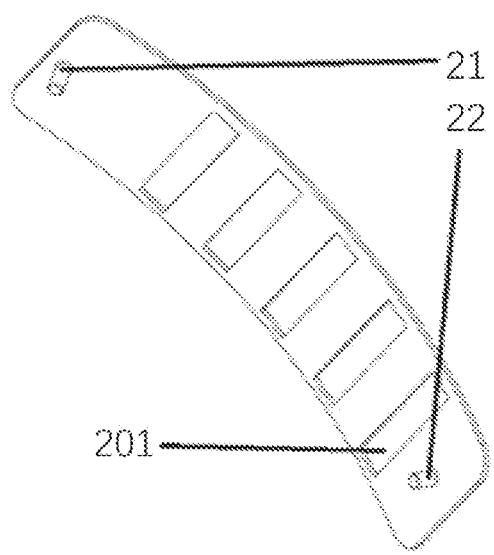
FIG. 9 is a structural schematic view of a back side of a scribing sheet of a brake dust filtering apparatus according to an embodiment of the present invention.

FIG. 7 is a structural schematic view of a front side of the base 10 of the brake dust filtering apparatus 100 according to an embodiment of the present invention. FIG. 8 is a structural schematic view of a back side of the base 10 of the brake dust filtering apparatus 100 according to an embodiment of the present invention. FIG. 9 is a structural schematic view of a back side of the scribing sheet 20 of the brake dust filtering apparatus 100 according to an embodiment of the present invention. As shown in FIG. 8, in one embodiment, one end of the base 10 is provided with a first longitudinal aperture 11 and a stepped boss 12. As shown in FIG. 4, the boss 12 matches with the first mounting portion 411 and is configured to limit the first mounting portion 411. Since a size of a top of the boss 12 is relatively large, movement space of the first mounting portion 411 along an axial direction thereof can be limited. As shown in FIG. 9, the scribing sheet 20 is provided with a first column part 21 corresponding to the first longitudinal aperture 11 and protruding towards the base 10, the first column part passes 21 through the first longitudinal aperture 11 and matches with the second mounting portion 413 to limit the second mounting portion 413.

As shown in FIG. 4, in a further embodiment, the brake dust filtering apparatus further includes a first fastening member 50, the first fastening member 50 is configured to match with the first column part 21 to limit the second mounting portion 413. By setting the first fastening member 50 matching with the first column part 21, the thermosensitive spring 41 can be prevented from falling out.

In one embodiment, the first column part 21 is cylindrical and is provided with screw thread on a surface thereof; the first fastening member 50 is a nut. Of course, in other embodiments that are not shown, other anti-falling structures can also be set, for example, a top of the first column part 21 is set as a cap part extending outward.

This embodiment provides a specific connection manner among the thermosensitive spring 41, the base 10, and the scribing sheet 20. Of course, in other embodiments that are not shown, it can also be other common connection manners, such as clamping, bonding, and so on, which are not limited here.

In another embodiment, another end of the base 10 is provided with a second longitudinal aperture 16; the scribing sheet 20 is provided with a second column part 22 corresponding to the second longitudinal aperture 16 and protruding towards the base 10, the second column part 22 is slidably sleeved in the second longitudinal aperture 16. When the thermosensitive spring 41 drives the scribing sheet 20 to slide relative to the base 10, the first column part 21 and the second column 22 moves in the first longitudinal aperture 11 and the second longitudinal aperture 16 respectively.

Optionally, both the first longitudinal aperture 11 and the second longitudinal aperture 16 are oblong holes, the boss 12 is of a cylindrical stepped shape, and both the first column part 21 and the second column part 22 are of cylindrical shape.

In one embodiment, as shown in FIG. 3, the scribing sheet 20 is located at a side of the base 10 away from the brake caliper 200. Of course, it is also possible to set the scribing sheet 20 at a side of the base 10 close to the brake caliper 200.

The filter screen 30 is fixed at the base 10 in a preset manner, and the preset manner includes one or more of clamping connection, bolt connection, and lock pin connection.

Figure 10:
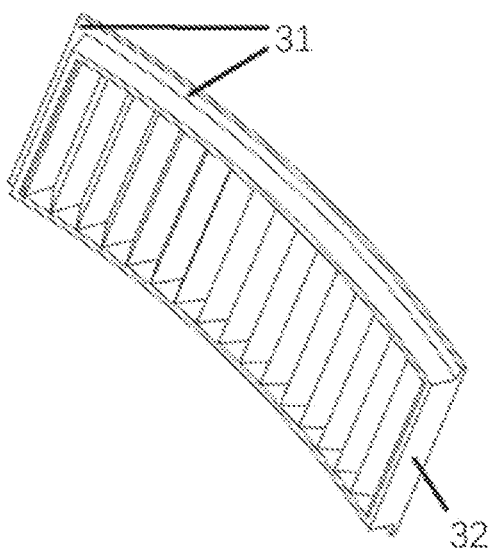
FIG. 10 is a structural schematic view of a back side of a filter screen of a brake dust filtering apparatus according to an embodiment of the present invention.

FIG. 10 is a structural schematic view of a back side of the filter screen 30 of the brake dust filtering apparatus 100 according to an embodiment of the present invention. As shown in FIG. 10, in a specific embodiment, the filter screen 30 is rectangular, its three side surfaces are respectively provided with protruding clamp strips 31, and the other side surface is a plane 32. As shown in FIG. 8, the base 10 is provided with a groove 13 configured to clamp the clamp strips 31 and an abutting protrusion 14 configured to abut against the plane 32. This embodiment provides a specific form of connection between the filter screen 30 and the base 10. During assembly and disassembly, the clamp strips 31 can slide in the groove 13, and finally limits a position of the filter screen 30 by contact between the plane 32 and the abutting protrusion 14. This connection manner is convenient for replacing the filter screen 30, which can be cleaned or replaced during normal maintenance of the vehicle. Therefore, the filter screen 30 can be maintained and replaced in time to ensure the best dust adsorption effect. Finally, removed filter screens 30 can be collectively recycled and uniformly treated.

In one embodiment, as shown in FIG. 2, the base 10, the scribing sheet 20, and the filter screen 30 are all of an arc shape matching with the brake caliper. This manner results in that a filtering area is larger and can be matched with an existing brake caliper 200, with small space occupation and low integration cost. The base 10, the scribing sheet 20, and the filter screen 30 are all sheet-shaped pieces, so their masses are also relatively light.

Of course, in other embodiments that are not shown, a surface of an overall shape of the brake dust filtering apparatus 100 can also be of circular, elliptical, and other shapes.

Optionally, as shown in FIG. 2, two ends of the base 10 are provided with mounting structures 15 configured to receive second fastening members and thereby fix the brake dust filtering apparatus 100 at the brake caliper 200 or a part around the brake caliper 200 (see FIG. 2). The mounting structure 15 can be in the form of the lifting lug shown in FIG. 2. The base 10 is fixed to relevant parts of the vehicle (such as the brake caliper 200) by the second fastening members (such as bolts or the like) to facilitate mounting on existing vehicles.

In an embodiment, the numbers of the first through holes 101 and of the second through holes 201 are equal.

Optionally, both the first through holes 101 and the second through holes 201 are rectangular, of course, they can also be circular, elliptical, etc., and there is no restriction here.

Optionally, both the first through holes 101 and the second through holes 201 are uniformly arranged, so that air flow passes through evenly.

In another embodiment, the drive member 40 includes an electronically controlled steering gear connected with the scribing sheet 20 and configured to drive the scribing sheet 20 to slide relative to the base 10 based on a brake state of the vehicle.

Optionally, the brake dust filtering apparatus 100 further includes a brake controller, which is connected with the electronically controlled steering gear and configured to receive a brake pedal signal of the vehicle to identify the brake state of the vehicle and send the brake state of the vehicle to the electronically controlled steering gear. That is, the electronically controlled steering gear can be connected with the brake controller mounted in the vehicle through wires. The brake controller can receive the brake pedal signal to identify whether the vehicle is in the brake state, and control the electronically controlled steering gear to turn on a switch of the dust adsorption apparatus at the right time.

In one embodiment, the electronically controlled steering gear can be further connected with a temperature collecting unit, the temperature collecting unit is configured to collect a temperature of the ventilated brake plate 300, when the temperature is higher than a preset value, the electronically controlled steering gear controls the scribing sheet 20 to slide. It also realizes controlling the brake dust filtering apparatus 100 to be turned on and off according to the temperature. However, compared with the previous way of using thermosensitive spring 41, the way of this embodiment requires more units to participate, and corresponding control programs need to be designed.

The present invention further provides a vehicle. As shown in FIG. 1, the vehicle includes a steering knuckle and a hub bearing 400, a matched brake caliper 200, and a ventilated brake plate 300; wherein the vehicle further includes the brake dust filtering apparatus 100 according to any one of the above embodiments.

The vehicle of this embodiment, by setting the independent brake dust filtering apparatus 100, can realize opening and closing control for brake dust, and is convenient to improve an efficiency of filtering dust.

At this point, those skilled in the art should understand that although exemplary embodiments of the present invention have been shown and described in detail here, many other variations or modifications that conform to the principles of the present invention can still be directly determined or derived according to the content disclosed by the present invention without departing from the spirit and scope of the present invention. Therefore, the scope of the present invention should be understood and recognized as covering all of other variants or modifications.

What is claimed is:

1. A brake dust filtering apparatus, wherein the brake dust filtering apparatus is configured to be mounted at a brake caliper of a vehicle or a part around the brake caliper, and comprises:
    a base which is provided with multiple first through holes;
    a scribing sheet which is provided with multiple second through holes and forms slidable connection with the base;
    a filter screen which is disposed on a side of the base configured to be close to the brake caliper and covers the first through holes; and
    a drive member which is configured for driving the scribing sheet to slide with respect to the base, so as to form an off-state in which each of the first through holes and each of the second through holes are staggered and an on-state in which the multiple first through holes at least partially overlap with the multiple second through holes.

2. The brake dust filtering apparatus according to claim 1, wherein the drive member is a thermosensitive spring of which one end is connected to the base and another end is connected to the scribing sheet; the thermosensitive spring is configured to deform by sensing a temperature, so as to keep the scribing sheet and the base in the off-state or in the on-state.

3. The brake dust filtering apparatus according to claim 2, wherein the thermosensitive spring comprises a first mounting portion, a connecting portion, and a second mounting portion which are connected sequentially; the first mounting portion and the second mounting portion are respectively connected with the base and the scribing sheet.

4. The brake dust filtering apparatus according to claim 3, wherein one end of the base is provided with a first longitudinal aperture and a stepped boss, the boss matches with the first mounting portion and is configured to limit the first mounting portion; the scribing sheet is provided with a first column part corresponding to the first longitudinal aperture and protruding towards the base, the first column part passes through the first longitudinal aperture and matches with the second mounting portion to limit the second mounting portion.

5. The brake dust filtering apparatus according to claim 4, further comprising a first fastening member, wherein the first fastening member is configured to match with the first column part to limit the second mounting portion.

6. The brake dust filtering apparatus according to claim 5, wherein the first column part is cylindrical and is provided with screw thread on a surface thereof; the first fastening member is a nut.

7. The brake dust filtering apparatus according to claim 4, wherein another end of the base is provided with a second longitudinal aperture; the scribing sheet is provided with a second column part corresponding to the second longitudinal aperture and protruding towards the base, the second column part is slidably sleeved in the second longitudinal aperture.

8. The brake dust filtering apparatus according to claim 1, wherein the scribing sheet is located at a side of the base away from the brake caliper.

9. The brake dust filtering apparatus according to claim 1, wherein the filter screen is fixed at the base in a preset manner, and the preset manner comprises one or more of clamping connection, bolt connection, and lock pin connection.

10. The brake dust filtering apparatus according to claim 9, wherein the filter screen is rectangular, three side surfaces of the filter screen are respectively provided with protruding clamp strips, and the other side surface is a plane; the base is provided with a groove configured to clamp the clamp strips and an abutting protrusion configured to abut against the plane.

11. The brake dust filtering apparatus according to claim 1, wherein the base, the scribing sheet, and the filter screen are all of an arc shape matching with the brake caliper.

12. The brake dust filtering apparatus according to claim 1, wherein two ends of the base are provided with mounting structures configured to receive second fastening members and thereby fix the brake dust filtering apparatus at the brake caliper or a part around the brake caliper.

13. The brake dust filtering apparatus according to claim 1, wherein the drive member comprises an electronically controlled steering gear connected with the scribing sheet and configured to drive the scribing sheet to slide relative to the base based on a brake state of the vehicle.

14. The brake dust filtering apparatus according to claim 13, further comprising a brake controller connected with the electronically controlled steering gear and configured to receive a brake pedal signal of the vehicle to identify the brake state of the vehicle and send the brake state of the vehicle to the electronically controlled steering gear.

15. A vehicle, comprising a steering knuckle, a hub bearing, a matched brake caliper, and a ventilated brake plate; wherein the vehicle further comprises a brake dust filtering apparatus according to claim 1.

16. The brake dust filtering apparatus according to claim 1, wherein the scribing sheet and the base keep being in the off-state when a temperature does not exceed a preset value, and the scribing sheet and the base keep being in the on-state when the temperature exceeds the preset value.

\* \* \* \* \*